United States Patent
Ham et al.

(10) Patent No.: US 7,308,257 B2
(45) Date of Patent: Dec. 11, 2007

(54) PRIVATE MOBILE COMMUNICATION SYSTEM FOR PROVIDING PUBLIC NETWORK BUSY STATE INFORMATION OF MOBILE COMMUNICATION TERMINAL

(75) Inventors: Young-Cheol Ham, Suwon-shi (KR); Gui-Jung Lee, Yongin-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 76 days.

(21) Appl. No.: 10/650,987

(22) Filed: Aug. 29, 2003

(65) Prior Publication Data

US 2004/0048614 A1    Mar. 11, 2004

(30) Foreign Application Priority Data

Sep. 10, 2002    (KR)    ............... 10-2002-0054633

(51) Int. Cl.
*H04Q 7/20*    (2006.01)
*H04M 1/00*    (2006.01)

(52) U.S. Cl. ............... 455/433; 455/445; 455/554.2
(58) Field of Classification Search ............ 455/433, 455/445, 461, 554.1, 554.2
See application file for complete search history.

(56) References Cited

U.S. PATENT DOCUMENTS

| | | | |
|---|---|---|---|
| 5,197,096 | A | 3/1993 | Sakuma et al. |
| 5,592,534 | A | 1/1997 | Ito |
| 5,953,651 | A * | 9/1999 | Lu et al. ............... 455/408 |
| 5,991,620 | A | 11/1999 | Kingdon et al. |
| 6,052,461 | A * | 4/2000 | Lam ............... 379/297 |
| 6,389,127 | B1 | 5/2002 | Vardi et al. |
| 6,400,698 | B1 | 6/2002 | Shaheen |
| 6,810,260 | B1 * | 10/2004 | Morales ............... 455/460 |
| 6,826,414 | B1 * | 11/2004 | Reynolds et al. ............... 455/555 |
| 2002/0068563 | A1 * | 6/2002 | Alperovich et al. ............... 455/433 |

(Continued)

FOREIGN PATENT DOCUMENTS

JP    07-023463    1/1995

(Continued)

OTHER PUBLICATIONS

Office Action from the Japan Patent Office issued in Applicant's corresponding Korean Patent Application No. 10-2002-54633 dated Oct. 18, 2005.

(Continued)

*Primary Examiner*—William Trost
*Assistant Examiner*—Marivelisse Santiago-Cordero
(74) *Attorney, Agent, or Firm*—Robert E. Bushnell, Esq.

(57) ABSTRACT

A private mobile communication system is for providing a public network busy state information of a mobile communication terminal. The private mobile communication system for informing a call origination mobile communication terminal of a public network busy state of a mobile communication terminal registered in a mobile communication system includes an HLR (Home Location Register) having a parameter indicating a public network busy state with respect to each mobile communication terminal registered in a private mobile communication system, and a message routing module for setting up a public network busy state of the mobile communication terminal in the case where the mobile communication terminal performs a call origination or a call reception over a public mobile communication network within a private mobile communication network.

19 Claims, 3 Drawing Sheets

U.S. PATENT DOCUMENTS

2003/0069013 A1* 4/2003 Lee et al. .................... 455/426
2004/0018833 A1* 1/2004 Praestgaard .............. 455/422.1
2004/0048610 A1* 3/2004 Kim et al. ............... 455/422.1

FOREIGN PATENT DOCUMENTS

| JP | 11-068962 | 3/1999 |
| JP | 11-155164 | 6/1999 |
| JP | 11-317981 | 11/1999 |
| KR | 2001107029 A * | 12/2001 |

OTHER PUBLICATIONS

Japanese Office Action corresponding to Japanese Patent Application No. 2003-318336, issued on Nov. 21, 2006.

* cited by examiner

| MIN | WIRED TERMINAL EXTENSION NUMBER | STATE |
|---|---|---|
| 1 | 3000 | PUBLIC NETWORK BUSY STATE |
| 2 | 3001 | EXTENSION BUSY STATE |

FIG.3

PRIVATE MOBILE COMMUNICATION SYSTEM FOR PROVIDING PUBLIC NETWORK BUSY STATE INFORMATION OF MOBILE COMMUNICATION TERMINAL

CLAIM OF PRIORITY

This application makes reference to, incorporates the same herein, and claims all benefits accruing under 35 U.S.C. §119 from an application for PRIVATE MOBILE COMMUNICATION SYSTEM OF PROVIDING INFORMATION FOR PUBLIC BUSY STATE OF A MOBILE STATION earlier filed in the Korean Industrial Property Office on 10, Sep. 2002 and there duly assigned Ser. No. 2002-54633.

BACKGROUND OF THE INVENTION

1. Field of the Invention

The present invention relates to a mobile communication system, and more particularly to a method for informing a user of a busy state in the case where a call reception is established with a private mobile communication network subscriber being in a call connection state with a public network in a system for providing public and private mobile communication services at the same time.

2. Description of the Related Art

Typically, a mobile communication network is classified into a public mobile communication network and a private (or office) mobile communication network, but it is impossible to interwork the public mobile communication network and the private mobile communication network. That is, a mobile communication system is designed and implemented to enable only a public mobile communication service or only a private mobile communication service, so that a subscriber of a mobile communication terminal registered in a network can receive a communication service over a specific network with which the subscriber is registered. Therefore, a subscriber of a mobile communication terminal registered in the public mobile communication network cannot receive a private mobile communication service, and a subscriber of a mobile communication terminal registered in a private mobile communication network cannot receive a public mobile communication service.

As a result, it is necessary for a subscriber of a mobile communication terminal to receive a public mobile communication service and a private mobile communication service at the same time, using a single mobile communication terminal. In case of implementing a system for providing public and private mobile communication services at the same time, it is necessary for the system to determine whether a called party's call is a call generated from a public mobile communication network or a call generated from a private mobile communication network.

However, in the case where a mobile communication terminal receiving the public and private mobile communication services at the same time is in a private network and then generates a call origination message, it is possible for a private mobile communication system to recognize a public network call origination or a public network call reception during a message routing procedure, but it is impossible for the private mobile communication system to recognize whether a call connection state expires.

That is, in the case where a call reception is established with a private wireless network subscriber being in a call connection state with a public network, it is impossible to recognize a public network busy state. Likewise, in accordance with a conventional system, a specific message such as a channel allocation/release (allocation and release) message in a call connection state is composed of traffic state packets, and it is impossible for a private wireless system to analyze the specific message.

SUMMARY OF THE INVENTION

The present invention is disclosed in order to overcome the aforesaid and other drawbacks of the background art.

It is therefore, an object of the present invention to provide a private mobile communication system for enabling a private wireless network system to recognize a public network busy state within a private network area by means of a mobile communication terminal in a system for providing public and private mobile communication services at the same time, and informing a corresponding mobile communication terminal of a public network busy state in the case where a call reception request is received in the mobile communication terminal within the private network area, thereby enhancing a user's convenience of use.

It is another object to have a public mobile communication system to efficiently interwork with a private mobile communication system.

It is yet another object to have a public mobile communication system to easily and inexpensively interwork with a private mobile communication system.

In accordance with the present invention, the above and other objects can be accomplished by the provision of a private mobile communication system interworking with a public mobile communication network, including: at least one mobile communication terminal registered in the private mobile communication system; a home location register (HLR) including a public network busy state value indicating call connection with the public mobile communication network of the mobile communication terminal; and a message routing module changing the public network busy state value registered in the home location register according to call connection with the public mobile communication network of the mobile communication terminal. The message routing module setting up a public network busy state value of a mobile communication terminal of the home location register when the mobile communication terminal in a public network busy state is handed off from the public mobile communication network to a private mobile communication network. The message routing module clearing a public network busy state value of a mobile communication terminal of the home location register when the mobile communication terminal closes a call connection state within a private mobile communication network. The message routing module determining the mobile communication terminal being out of a private mobile communication network when the mobile communication terminal in a public network busy state is handed off from the private mobile communication network to the public mobile communication network. The message routing module clearing a public network busy state value of the mobile communication terminal of the home location register when the mobile communication terminal closes a call connection state within the private mobile communication network. The message routing module determining the mobile communication terminal being out of the private mobile communication network when the mobile communication terminal in a public network busy state is handed off from the private mobile communication network to the public mobile communication network. A call origination mobile communication terminal originated through a private mobile communication network being informed of a public network busy state of the mobile communication terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is an exemplary view of subscriber information registered in a private mobile communication service stored in a private Home Location Register (pHLR) in accordance with a preferred embodiment of the present invention.

DETAILED DESCRIPTION OF THE PREFERRED EMBODIMENTS

Figure 1:
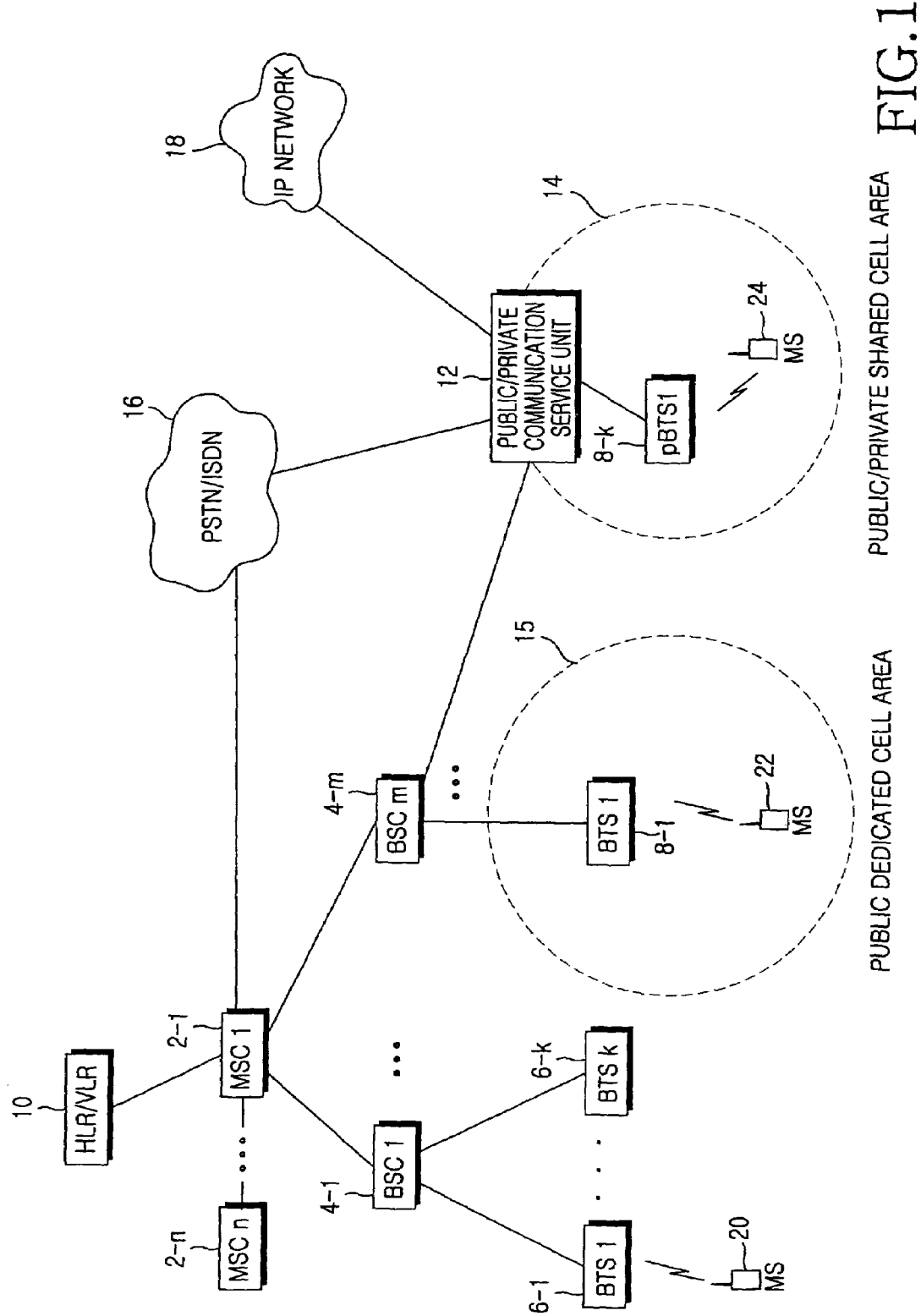
FIG. 1 is a view illustrating a network configuration for explaining a concept of public and private mobile communication services in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

A public/private (public and private) mobile communication system is based on an ATM (Asynchronous Transfer Mode), and a message such as a channel allocation/release (allocation and release) message is transmitted via an additional signal channel instead of a traffic channel. So, the present invention implements a method for accurately recognizing a public network call connection state completion of a private wireless terminal by means of a signal analysis, thereby providing a public network busy state control function. The mobile communication terminal enables a private mobile communication system to recognize a public network busy state within a private wireless network, and informs the private mobile communication system of a public network busy state in the case where a corresponding wireless terminal receives a call reception request, thereby enhancing a user's convenience of use.

For this purpose, the present invention manages an operation whereby channels of lower base stations of a private wireless network system are allocated for a public network call. To manage such a channel allocation, a BTMR (pBTS Message Router (private Base station Transceiver Subsystem Message Router)) according to the present invention performs a message routing toward either a base station or an upper BSC (Base Station Controller). If there is a channel allocation request from an upper system (i.e., an upper BSC and a neighbor upper BSC) in association with a private mobile communication terminal, the BTMR records this channel allocation request information. In case of completing a channel allocation operation, the BTMR changes a public network busy state of a mobile communication terminal positioned in a private HLR on the basis of the channel allocation completion information. Then, if this channel is released, the BTMR determines the number of public network channels allocated to a call of the released channel, and clears a public network busy state of a mobile communication terminal positioned in a private HLR when all public network channels are released.

FIG. 1 is a view illustrating a network configuration for explaining a concept of public and private mobile communication services in accordance with a preferred embodiment of the present invention. Referring to FIG. 1, a public/private shared cell area 14 being a shared communication service area between a public mobile communication service and a private mobile communication service is provided to establish public and private mobile communication services at the same time. Also, a public/private (public and private) communication service unit 12 is shown in FIG. 1. It is desirable that the public/private cell shared cell area 14 should provide a specific group with a convenient communication service. For example, provided that a specific company uses a single building, an area containing the building can be determined as a public/private shared cell area 14. It is desirable that the operation for determining the public/private shared cell area 14 is discussed with a public mobile communication service provider in advance. The reason why the operation for determining the public/private shared cell area 14 is discussed with the public mobile communication service provider is to enable a private base station transceiver subsystem (i.e., a private BTS: 8-$k$) in the public/private (public and private) shared cell area 14 to be recognized like a public BTS from the viewpoint of a public mobile communication system. In a preferred embodiment of the present invention, the private BTS (8-$k$) is called a 'pBTS (private BTS)' to distinguish a plurality of BTSs, i.e., BTSs 6-1, . . . 6-$k$, 8-1 from a private BTS (8-$k$) of the public/private shared cell area 14. The pBTS(8-$k$) performs a function for constructing a wireless communication path in association with a mobile station (MS) 24 contained in a public/private shared cell area 14 and a function for managing wireless resources in association with the mobile station (MS) 24. The pBTS(8-$k$) is connected to a BSC (Base Station Controller) of a public mobile communication system via a public/private communication service unit 12. Namely, the pBTS(8-$k$) is connected to a BSC(4-$m$) via the public/private communication service unit 12. The public/private communication service unit 12 is connected to a BSC(4-$m$) of a public mobile communication system, a PSTN/ISDN (Public Switched Telephone Network and Integrated Services Digital Network) 16, and an IP (Internet Protocol) network 18. The public/private communication service unit 12 performs a mobile communication service to enable a public mobile communication service or a private mobile communication service to be selectively provided to a plurality of MSs (e.g., a MS 24) contained in the public/private shared cell area 14. In the case where the MS 24 is registered in the public/private communication service unit 12 to receive a private mobile communication service, it can receive a private mobile communication service as well as a public mobile communication service. But, in the case where a private mobile communication service registration of the MS 24 is not recorded in the public/private communication service unit 12, the MS 24 can receive only a public mobile communication service. Also, the public/private communication service unit 12 performs a wired communication service with the PSTN/ISDN 16 and the IP network 18.

In the meantime, the public mobile communication network is typically called a PLMN (Public Land Mobile Network). A public mobile communication system for the PLMN includes a plurality of MSCs (Mobile Switching Centers) 2-1, . . . , 2-n, a plurality of BSCs (Base Station Controllers) 4-1, . . . , 4-m, a plurality of BTSs (Base station Transceiver Subsystems) 6-1, . . . , 6-k. 8-1, . . . , 8-k, a plurality of mobile stations MSs 20 and 22, and a HLR/VLR (Home Location Register and Visitor Location Register) 10. The plurality of BSCs 4-1, . . . , 4-m are connected to each of the MSCs 2-1, . . . , 2-n. The plurality of BTSs 6-1, . . . , 6-k, 8-1, . . . , 8-k are connected to each of the BSCs 4-1, . . . , 4-m. In particular, the pBTS(8-k) functions as one of the BTSs 8-1, . . . , 8-k connected to the BSC(4-m) of a public mobile communication system in accordance with a preferred embodiment of the present invention. Each of the MSCs 2-1, . . . , 2-n enables a plurality of BSCs (for example, 4-1, . . . , 4-m) connected to the MSCs 2-1, . . . , 2-n to be themselves connected with other MSCs contained in either a PSTN/ISDN or a public mobile communication network. Each of the BSCs 4-1, . . . , 4-m performs a wireless link control function and a hand-off function. The BTSs 6-1, . . . , 6-k, 8-1, . . . , 8-k configure a wireless communication path together with MSs 20, 22 and 24 contained in their own communication service areas, i.e., their own cell areas, and perform a function for managing wireless resources. An HLR in the HLR/VLR 10 performs a subscriber location registration function and a database function for storing subscriber information, and a VLR in the HLR/VLR 10 is a database for temporarily storing information of a MS present in a cell area managed by a corresponding MSC among the MSCs 2-1, . . . , 2-n. If the MS moves to a cell area managed by another MSC, information stored in the VLR is deleted. In the preferred embodiment of the present invention, in order to discriminate between the public/private (public and private) shared cell area 14 and communication service areas of the BTSs (6-1, . . . , 6-k, 8-1, . . . ) of a public mobile communication system, each communication service area of the BTSs (6-1, . . . , 6-k, 8-1, . . . ) is called a public dedicated cell area. A communication service area of the BTS(8-1) among the BTSs (6-1, . . . , 6-k, 8-1, . . . ) of the public mobile communication system is indicated as a public dedicated cell area 15. The public dedicated cell area 15 is generally wider than the public/private shared cell area 14 predefined to provide a specific group with a convenient communication service.

Figure 2:
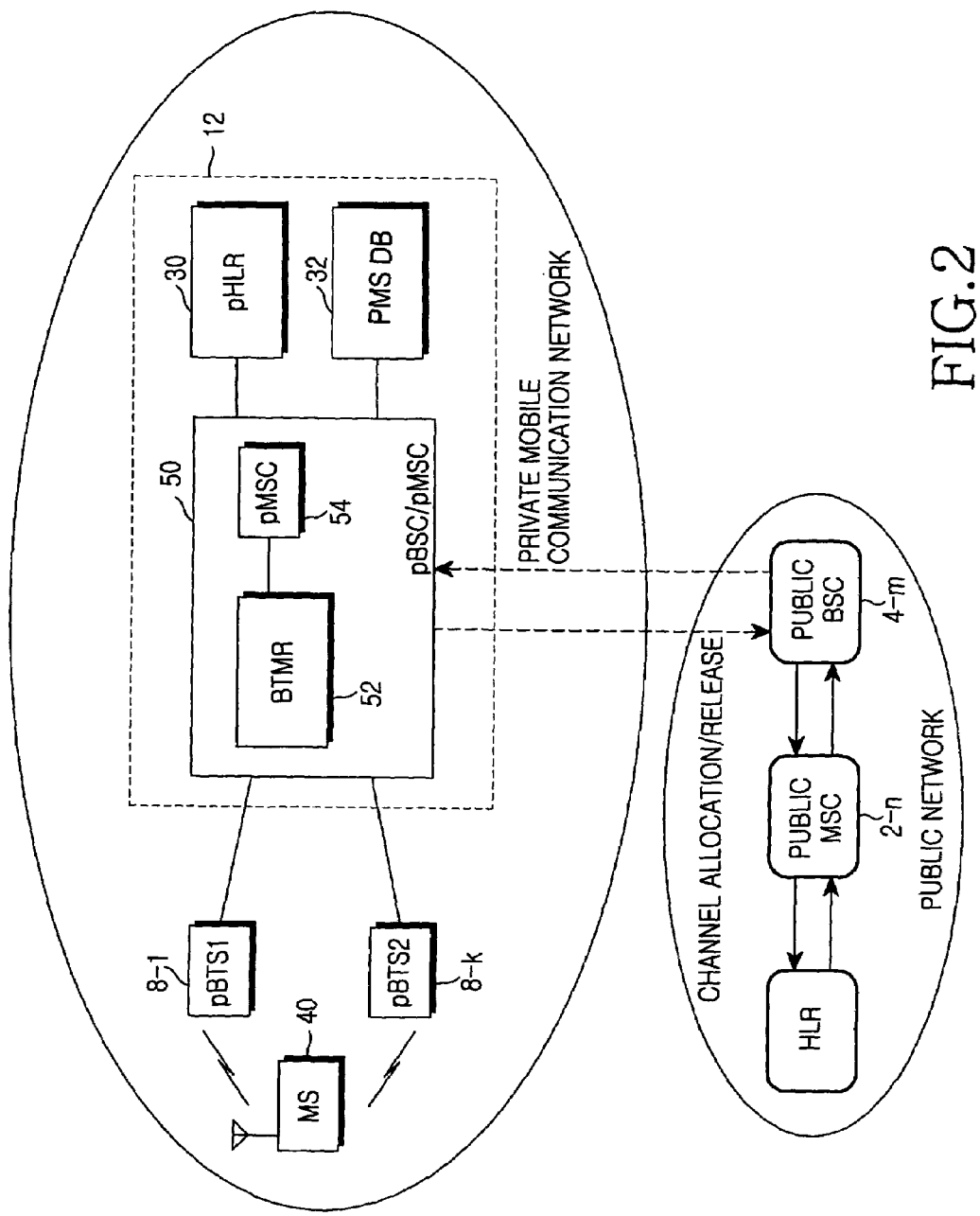
FIG. 2 is a view illustrating a detailed block diagram of a private mobile communication system in accordance with a preferred embodiment of the present invention.

FIG. 2 is a view illustrating a detailed block diagram of a private mobile communication system in accordance with a preferred embodiment of the present invention.

The present invention manages an operation whereby channels of lower base stations (i.e., BTSs) of a private mobile communication system are allocated for a public call. Many base stations relate to a public network call connection due to a hand-off operation of a mobile communication terminal, but a private wireless system manages a channel allocation state of base stations (i.e., BTSs) connected to the private wireless system itself so that it can accurately recognize a public network busy state of a private terminal.

There is a module (i.e., a BTMR) for routing a message related to a base station in the private mobile communication system. If an upper system (i.e., an upper BSC and a neighbor upper BSC) generates a channel allocation request signal with respect to a private wireless terminal, the BTMR records the channel allocation request signal. Then, if a channel allocation is completed, the BTMR changes a public network busy state of a private terminal within a private HLR on the basis of the channel allocation completion information. Thereafter, if a channel release is established, the BTMR determines the number of public channels currently allocated to a call of the released channel, and clears a public network busy state of a private terminal within a private HLR when all public channels are released. Also, the BTMR processes an error caused by a lost message.

Referring to FIG. 2, a private mobile communication system provides a subscriber of a mobile station (MS) 40 of a limited area (e.g., a zone or a building) with a wireless private network service. The private mobile communication system includes two pBTSs 8-1 and 8-k, and a public/private communication service unit 12 for performing functions of a private base station controller (pBSC) and a private mobile switching center (pMSC) of a public mobile communication system. The public/private communication service unit 12 includes a pBSC/pMSC 50, a pHLR (private Home Location Register) 30, and a PMS DB (Public MS database) 32. The pBSC/pMSC 50 includes a BTMR (pBTS Message Router) 52 and a pMSC 54. The BTMR 52 performs functions corresponding to a BSC of a public mobile communication system. Namely, the BTMR 52 performs a wireless link control function and a hand-off function. In more detail, the BTMR 52 is a module for performing a path designation of all messages to be treated in the pBTS 8-k, designates a control (i.e., a signal) message path for public and private call origination/reception services of a MS 40 with reference to an internal router table, and designates a message path for a maintenance service of the pBTS 8-k. Also, the BTMR 52 communicates with the pHLR 30.

In more detail, the BTMR 52 performs a routing of a message related to a lower BTS of a private wireless network system. Such a message includes public network channel allocation request/confirm (request and confirm) messages and a release request message of a public network channel. The public network channel allocation request/confirm messages include a channel allocation in association with an initial call origination (i.e., a public network call origination within a private wireless network system), a channel allocation for a soft hand-off operation within a BSC of a private wireless network system, and a message related to a channel allocation for a soft hand-off operation between BSCs. MS-ID (i.e., ESN/MIN, Electronic Serial Number/Mobile Identification Number) information of a mobile communication terminal is contained in the channel allocation request message, and is not contained in the confirm message. In order to establish a management service of a public network allocation channel and a public network busy state service of a private mobile communication terminal, information of the mobile communication terminal needs to be recorded in case of a channel allocation request, so that the channel allocation request/confirm messages are all used while performing the public network allocation channel management service and the public network busy state service. The release request message of the public network channel includes a channel release request in case of finishing a call connection state, and a message related to a channel release request in case of a soft hand-off drop. Such a release message is a message for requesting a release of a channel ranging from an upper system to a base station in case of either a call cutoff state or a hand-off drop state. Therefore, if the release message is generated, it is determined that a channel is released irrespective of the next confirm message from the base station.

The pMSC 54 performs a function corresponding to a role of a MSC of a previous public mobile communication network in case of supporting a public mobile communication network service and a private mobile communication network service. In more detail, the pMSC 54 analyzes a service request of a subscriber, and defines a basic strategy for determining whether the service request is treated using a previous public mobile communication network service or is treated using a private mobile communication network service, and a control procedure related to the basic strategy. The pMSC 54 cannot perform a switching function by itself, differently from the public MSC. The pMSC 54 is a software block so that it has no switch such as a public MSC. Accordingly, in case of providing a private mobile communication service, a public/private communication service unit 12 according to the present invention uses a switch of a private exchange system (not shown). The pHLR 30 is a module for managing subscriber information registered in a private mobile communication service, location registration information of a private mobile communication subscriber, and information for a variety of function services. A database for storing various kinds of information is connected to the pHLR 30.

The present invention further includes a PMS DB (Public MS database) 32 for managing a public network allocation channel. The PMS DB 32 is adapted as a database for determining a public network busy state of a specific private mobile communication terminal. For this purpose, the PMS DB 32 is designed to have a size of the maximum possible public network call connection number, and call identification information (call_job_id) is carried in each call signal (i.e., a public network call signal of a specific mobile communication terminal). A hand-off channel is discriminated from other channels on the basis of channel identification information (leg_id). Three channel identification information may maximally be provided at the same time. Meanwhile, in case of a call release, the call identification information is not contained in a release message, and base station identification information brc_job_id and brc_db_id are only contained in the release message, so that the PMS DB 32 stores base station identification information related to each channel in case of a channel allocation operation.

The operation of the PMS DB 32 is controlled by a signal indicating a public network busy state. For an ideal process, in the case where call identification information call_job_id exists in a specific index of the PMS DB 32 and a channel also exists in the specific index, a public network state of a HLR DB (Home Location Register database) of a private mobile communication terminal of a corresponding ESN should be a busy state. But, in fact, it is difficult to implement such public network busy state in the above case. If the BTMR 52 determines that a public network of a mobile communication terminal is in a busy state using the PMS DB 32, it updates the HLR DB. The BTMR 52 performs an error correction function with respect to a public network busy state of the HLR DB during a call control process in order to provide accurate information on condition that a public network is in a busy state.

The BTMR 52 does not distinguish a channel allocation related message from public network busy state information of the PMS DB 32 in light of a channel management operation. In case of intercepting a channel allocation request message toward a base station (i.e., a BTS), the BTMR 52 records call identification information, channel identification information, and mobile communication terminal identification information (MSID) contained in the channel allocation request message. If a channel allocation confirmation message is received from the base station, the BTMR 52 searches the PMS DB 32 only when a corresponding channel allocation is normally performed, stores base station identification information brc_db_id and brc__job_id contained in corresponding call identification information, and finally sets a MS public network busy state of the HLR DB to a busy state.

Thereafter, the BTMR 52 receives a message indicating that a public network call of a mobile communication terminal is completely finished. In the case where several channels are allocated by a soft hand-off operation, the message is transmitted to each base station classified by channel identification information. But, the BTMR 52 deletes all channel identification information contained in a corresponding call identification information DB of a PMS DB 32 and clears a public network busy state of an HLR in such a way that errors are reduced.

Also, if a mobile communication terminal (MS) 40 is handed off from a private mobile communication network to a public network, the BTMR 52 clears corresponding channel identification information within the PMS DB 32, and maintains a public network busy state of a pHLR 30. In this case, if all channels are cleared, the BTMR 52 determines that the mobile communication terminal (MS) 40 is out of a private mobile communication network area during a hand-off period. Therefore, the BTMR 52 clears the PMS DB 32, clears a public network busy state of the pHLR 30, and changes a state of the MS 40 to an out of control state. Herein, the reason for changing the state of the MS 40 to the out of control state is to reduce the next paging time and public network conversion time because the mobile communication terminal (MS) 40 being in a call connection state is surely out of the private mobile communication network.

In the meantime, since the BTMR 52 manages a public network busy state through a channel allocation state for a public network call, a mobile communication terminal in an idle state within a private mobile communication network may not establish a call connection state in that a public network busy state is maintained because of an unpredictable matter. To solve this problem, a BTMR task and a call task update a public network busy state if a database of the pHLR 30 needs to be read and recorded, thereby performing an error correction function. Firstly, in the case where call reception/origination (reception and origination) operations of a mobile communication terminal are performed in a private mobile communication network, the BTMR 52 clears a public network busy state of a corresponding mobile communication terminal. The BTMR 52 clears a public network busy state in case of updating the HLR DB in order to perform a routing operation. Secondly, the BTMR 52 clears a public network busy state of a corresponding mobile communication terminal in case of registering a location of the mobile communication terminal (MS) 40. The call task clears a public network state in case of receiving location registration information of the MS 40 from the BTMR 52. Thirdly, in the case where the call identification information is identical with that of a PMS DB index and the MS ID such as an ESN/MIN is different from that of the PMS DB index in case of updating the information of the PMS DB 32, the BTMR 52 clears the corresponding PMS DB index and clears a public network state of a corresponding mobile communication terminal.

The pHLR 30 stores subscriber information registered in a private mobile communication service. For example, the pHLR 30 stores a MIN (Mobile Identification Number) of the mobile station (MS), a wired terminal extension number, and a subscriber name as shown in FIG. 3. In accordance with the present invention, the pHLR 30 includes a parameter indicating a public network busy state of each private mobile communication terminal, and updates the public network busy state of each mobile communication terminal according to information of the BTMR 52. Therefore, if a call reception is performed in a mobile communication terminal of a public network busy state, the BTMR 52 performs a call control operation with reference to the parameter stored in the pHLR 30 to indicate a public network busy state.

As apparent from the above description, the present invention enables a private mobile communication system to recognize a public network busy state within a private wireless network, and informs a corresponding wireless terminal of a public network busy state in the case where a call reception request is received in the corresponding wireless terminal within the private wireless network area, thereby enhancing a user's convenience of use.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A private mobile communication system interworking with a public mobile communication network, comprising:
   at least one mobile communication terminal registered in said private mobile communication system;
   a home location register provided in said private mobile communication system including a public network busy state value indicating call connection with the public mobile communication network of the mobile communication terminal; and
   a message routing module changing the public network busy state value registered in the home location register according to call connection with the public mobile communication network of the mobile communication terminal.

2. The private mobile communication system as set forth in claim 1, with said message routing module setting up a public network busy state value of a mobile communication terminal of said home location register when the mobile communication terminal in a public network busy state is handed off from the public mobile communication network to a private mobile communication network.

3. The private mobile communication system as set forth in claim 2, with said message routing module clearing a public network busy state value of the mobile communication terminal of said home location register when the mobile communication terminal closes a call connection state within the private mobile communication network.

4. The private mobile communication system as set forth in claim 3, with said message routing module determining the mobile communication terminal being out of the private mobile communication network when the mobile communication terminal in a public network busy state is handed off from the private mobile communication network to the public mobile communication network.

5. The private mobile communication system as set forth in claim 1, with said message routing module clearing a public network busy state value of a mobile communication terminal of said home location register when the mobile communication terminal closes a call connection state within a private mobile communication network.

6. The private mobile communication system as set forth in claim 1, with said message routing module determining the mobile communication terminal being out of a private mobile communication network when the mobile communication terminal in a public network busy state is handed off from the private mobile communication network to the public mobile communication network.

7. The private mobile communication system as set forth in claim 1, further comprising a call origination mobile communication terminal originated through a private mobile communication network being informed of a public network busy state of the mobile communication terminal.

8. The private mobile communication system as set forth in claim 1, with said message routing module further clearing the public network busy state of a mobile communication terminal of said home location register when registering a location of the mobile communication terminal.

9. The private mobile communication system as set forth in claim 1, with said message routing module further clearing the public network busy state value of a mobile communication terminal of said home location register when a call identification information is identical with an index and a mobile communication terminal identification value is different than the index.

10. The private mobile communication system as set forth in claim 1, with said message routing module clearing a public network busy state of the mobile communication terminal when the mobile communication terminal originates or receives a call of a private network within the private,mobile communication network.

11. A method, comprising:
    registering in a home location register provided in a private mobile communication system a public network busy state value indicating call connection with a public mobile communication network of a mobile communication terminal; and
    changing the public network busy state value registered in the home location register according to a call connection with the public mobile communication network of the mobile communication terminal,
    said changing of the public network busy state being made by a message routing module.

12. The method as set forth in claim 11, further comprised of an act of setting up the public network busy state value of a mobile communication terminal of said home location register being when the mobile communication terminal in a public network busy state is handed off from a public mobile communication network to a private mobile communication network.

13. The method as set forth in claim 12, further comprising of clearing a public network busy state value of the mobile communication terminal of said home location register when the mobile communication terminal closes a call connection state within the private mobile communication network.

14. The method as set forth in claim 11, further comprising of clearing a public network busy state value of a mobile communication terminal of said home location register when the mobile communication terminal closes a call connection state within a private mobile communication network.

15. The method as set forth in claim 11, further comprising of determining the mobile communication terminal being out of a private mobile communication network when the mobile communication terminal in a public network busy state is handed off from the private mobile communication network to the public mobile communication network.

16. The method as set forth in claim 11, further comprised of accommodating a private mobile communication system informing a call origination mobile communication terminal originated from the private mobile communication network of a public network busy state of the mobile communication terminal.

17. A private communication system, comprising:
a home location register connectable to a private mobile communication system to register a public network busy state value indicating call connection with a public mobile communication network of a mobile communication terminal; and
a message routing module changing the public network busy state value registered in the home location register according to a call connection with the public mobile communication network of the mobile communication terminal.

18. The private mobile communication system as set forth in claim 17, with said message routing module clearing the public network busy state of a mobile communication terminal of said home location register when registering a location of the mobile communication terminal.

19. The private mobile communication system as set forth in claim 17, with said message routing module clearing the public network busy state value of a mobile communication terminal of said home location register when a call identification information is identical with an index and a mobile communication terminal identification value is different than the index.

* * * * *